Figure 1:
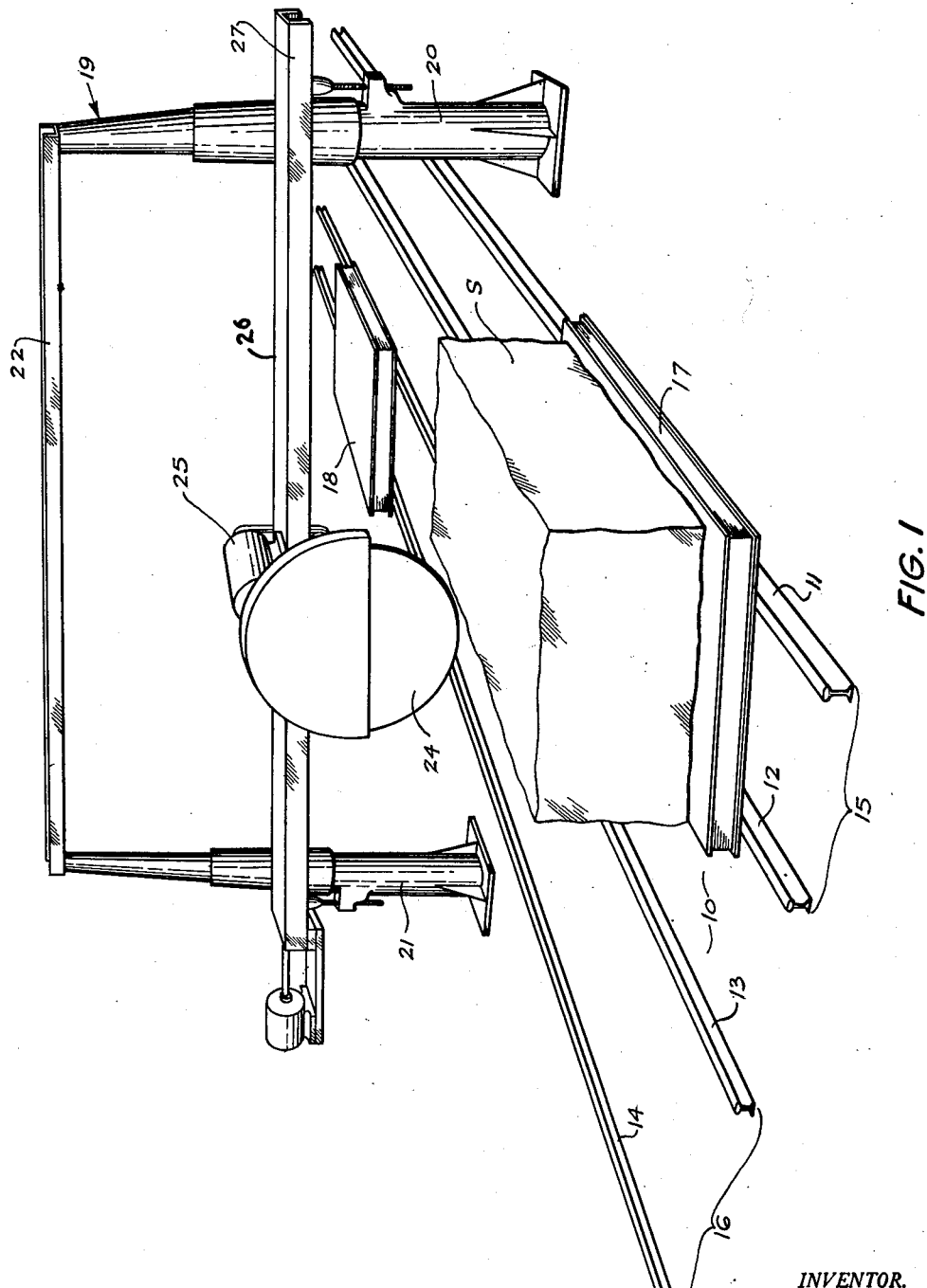

April 8, 1952  E. W. BEREIT  2,592,001
HYDRAULIC MOVING, POSITIONING, AND HOLDING MECHANISM
Filed Aug. 6, 1949  7 Sheets-Sheet 1

INVENTOR.
EDWIN W. BEREIT
BY

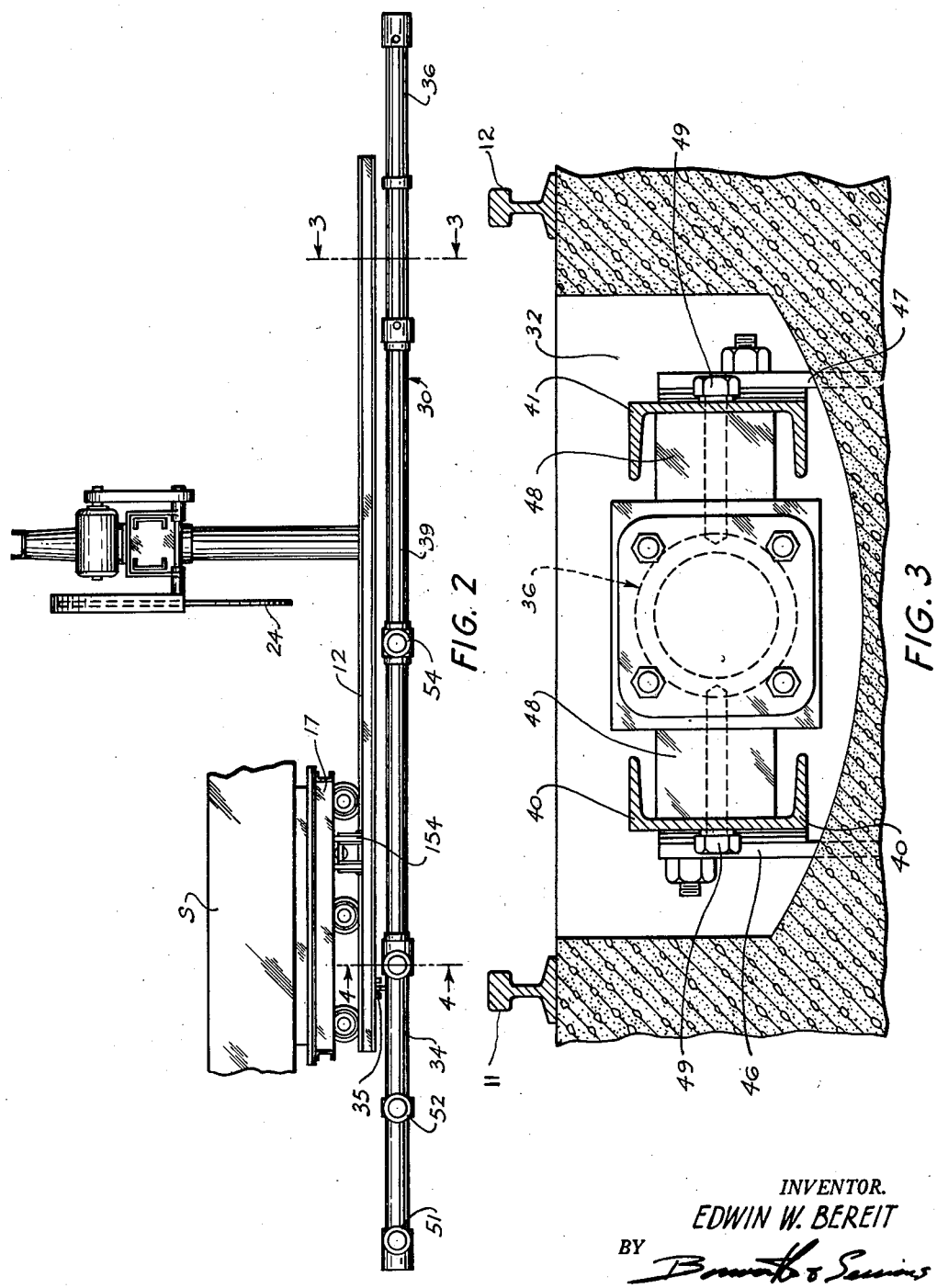

April 8, 1952     E. W. BEREIT     2,592,001
HYDRAULIC MOVING, POSITIONING, AND HOLDING MECHANISM
Filed Aug. 6, 1949     7 Sheets-Sheet 3
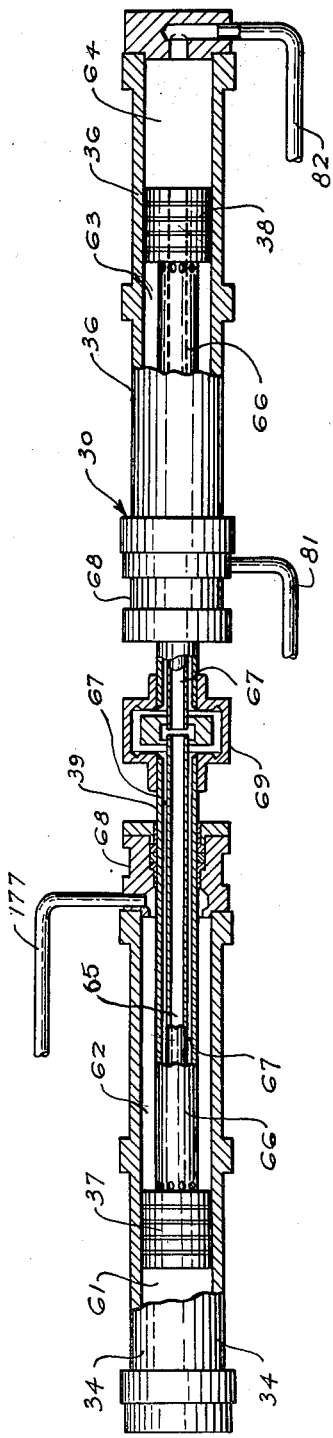
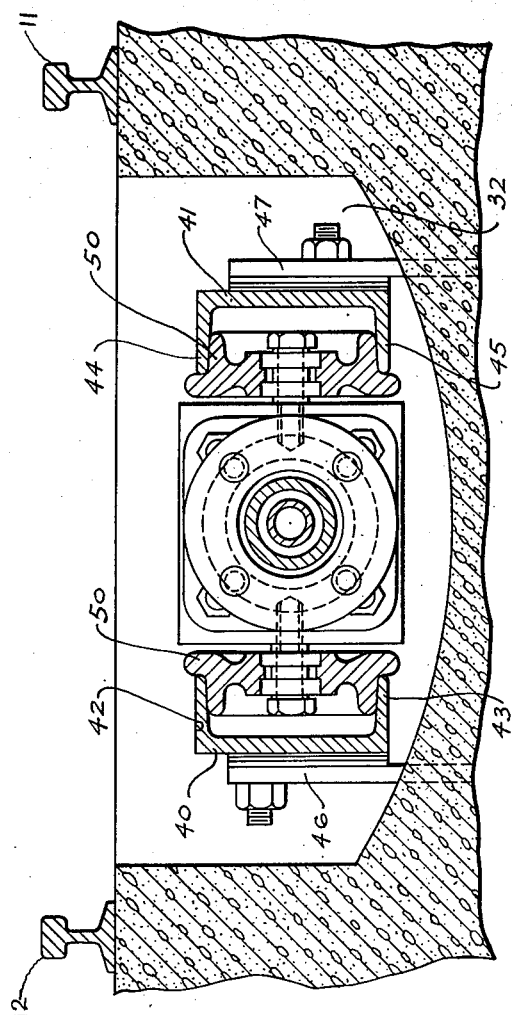
INVENTOR.
EDWIN W. BEREIT

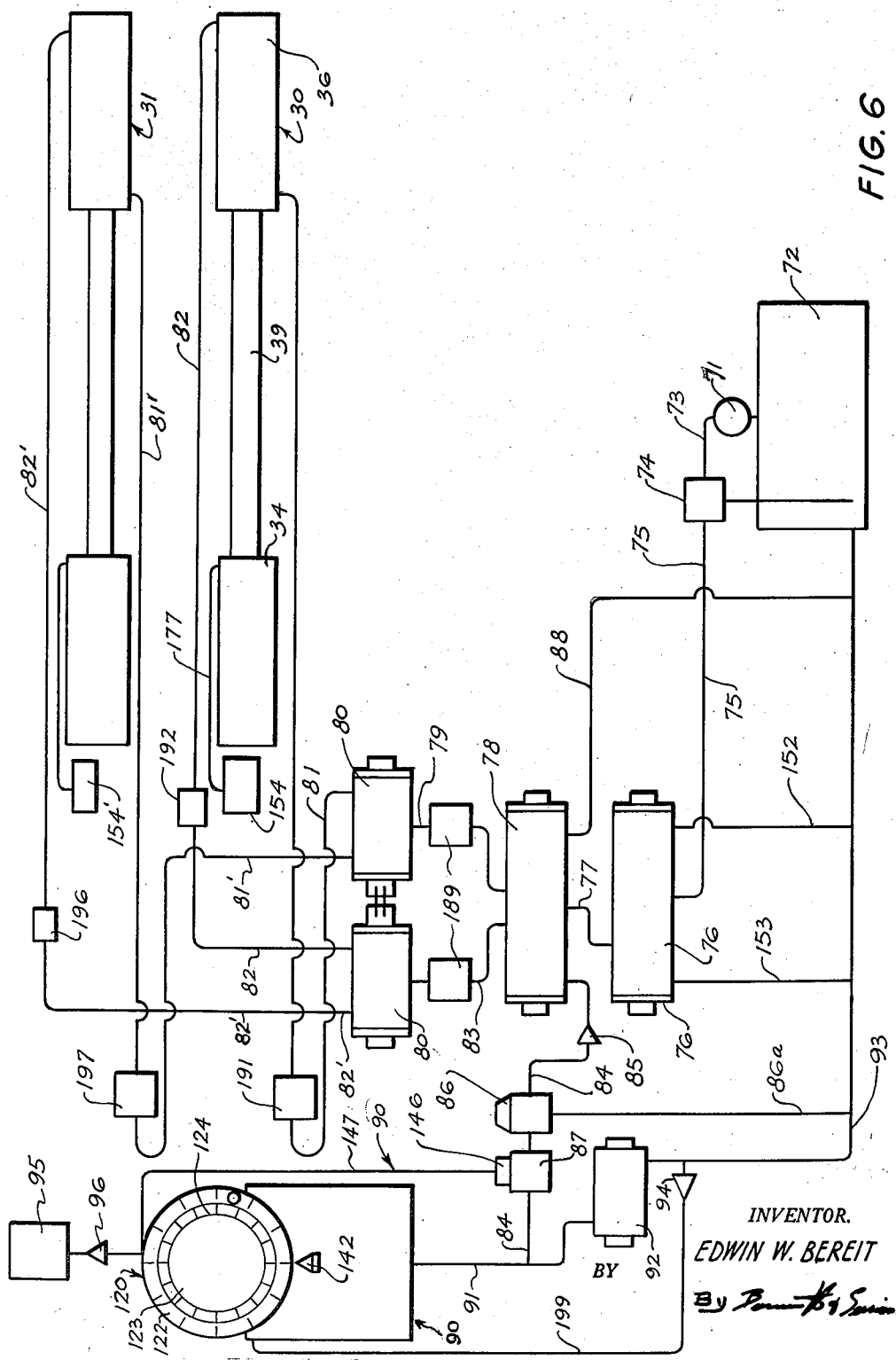

INVENTOR.
EDWIN W. BEREIT

INVENTOR.
EDWIN W. BEREIT

Patented Apr. 8, 1952

2,592,001

UNITED STATES PATENT OFFICE 2,592,001

HYDRAULIC MOVING, POSITIONING, AND HOLDING MECHANISM

Edwin W. Bereit, Cleveland, Ohio, assignor to Ingalls Stone Company, Bedford, Ind., a corporation of Delaware Application August 6, 1949, Serial No. 108,976

9 Claims. (Cl. 125—14)

This invention relates to measuring movement, moving, positioning and holding bodies, objects or instrumentalities and has a particular and illustrative application and advantage, as herein specifically illustrated and described, in the art and environment of cutting stone.

In prior methods of cross sawing stone, the often massive stone is carried by cars which are moved on rails to bring the stone into position, and the saw is then moved laterally across the work to make the desired cut. Successive cuts are made according to a schedule or layout which determines the order in which the desired sizes of blocks can be cut from the rough stone avoiding or taking advantage of the natural defects or beauties of texture and color which frequently occur in the rough stone and endeavoring to produce the least amount of waste stone. Under such conditions successive cuts often require different feeding strokes and as a result manual measuring and positioning of the stone is repeatedly necessary. Often the lines of cut are laid out with chalk and the cars carrying the stone are inched along the rails by manually operated mechanical jacks and stopped in approximately the desired position by visually aligning the work with the saw and by such expedients as may be available, however imperfect. Often the work has to be moved back and forth several times until it finally appears to be correctly positioned. Positioning stone in this manner is neither easy nor accurate for the loads of rough stone have weights of the order of 20 tons or more, and the high inertias encountered with such loads tend to cause the stone to over-travel, making it difficult to move the stone and car to or stop the work in the desired position. As a consequence much stone is wasted because it has been cut inaccurately. Limestone facing, for example, which is intended to be cut in 30" lengths cannot be set if its height as measured in the wall is as little as 1/16-1/8" "off" in dimension. Tolerances less than 1/64" are readily held with my invention. On the other hand if the stone carrying car should move but a very small fraction of an inch while the saw is cutting at its tremendous cutting speed the great probability is that the saw would be damaged or ruined with much economic loss and great hazard to the workmen engaged in the operation.

In the present invention hydraulic means are provided to move the stone and car accurately and positively into the desired positions and to hold them securely in place while the sawing operation is taking place. The hydraulic means includes a hydraulic positioning motor consisting of a piston and cylinder arrangement adapted to move the cars which carry the stone into the desired positions. Accurate positioning of the car and hence of the stone which it carries is achieved by means of a metering device which receives exhaust liquid from the motor and which can be adjusted to limit the amount of liquid which can be exhausted from the motor to any desired volume. This volume of exhaust liquid is a measure of the travel of the motor piston and hence is also a measure of the movement of the stone. Adjustment of the metering device to accept different accurately measured volumes of exhaust liquid enables the operator to select successive working strokes of the motor piston as desired and enables him to follow any desired sawing schedule. The positioning is accomplished in spite of the high inertias of the heavy loads of stone, the high inertias being overcome by means of decelerating devices which automatically take effect as the stone approaches the desired position to reduce the speed of the stone gradually and smoothly, making it possible to stop the stone accurately in place without deleterious shock. Once the stone is positioned, it is held firmly in position during the sawing operation by reducing the pressure within the hydraulic positioning motor substantially to zero to eliminate any tendency of the motor to cause the stone to creep or to shift position as a result of fluid leakage. This same reduction in pressure is utilized to actuate a brake, which clamps the rails to hold the car in fixed locked position.

While the problem solved by my invention is sharply illustrated in moving, positioning and holding massive stone loads to be worked upon, my invention is not without utility and advantage as applied to other materials and other loads of different size and mass. For example, the movement, etc., of stone cars on rails as herein described may be taken as illustrative of the utility of my invention for corresponding movement, positioning and holding of any kind of work supporting carriages, planer beds, machine tool tables and the like for purposes like or similar to those described herein. Similarly my invention is not necessarily limited to moving work to a saw or other tool since, as in the rip sawing of stone, my invention has utility in moving, position and holding a saw or other tool or instrumentality in selected positions relative to the work or path of movement of the work. The preferred form and embodiment herein illustrated and described in one environment should be taken by way of exemplification and not limitation.

A general object of my invention, therefore, is to provide a method and mechanism for moving work or a working instrumentality an accurately measurable distance into position for a working operation and holding it securely for such operation. Another object is to provide an hydraulic method and mechanism for positioning work at any desired point and any desired pre-selected distance from any point in the travel of the work. More particularly it is an object to accurately move and position massive work by an hydraulic motor whose working stroke is controlled by limiting the flow of exhaust liquid therefrom by predetermined metered amounts and at controlled pressures. Another object is to provide an hydraulic method and mechanism for measuring accurately in advance the distance a load is to be moved and moving loads having high inertias into desired positions without mechanical or hydraulic shock and without over-travel. Another object is to provide an hydraulic method and mechanism for moving work into a precise predeterminable position in which the speed of the movement of the work toward the desired position is decelerated as the work nears position and in which the work is then securely held in such position. Another object is to provide stone cutting equipment which is flexible in operation and which can be readily adjusted to any desired schedule of sawing. Another object is to provide for moving massive stone loads into position for sawing in which during the sawing operation the hydraulic system is substantially free from pressure to eliminate all tendency to creep and in which the work is positively clamped in place to prevent shifting of the stone. Another object is to provide an hydraulic drive for moving a stone and/or a rail car for carrying the same which is compact, which provides convenience and ease of operation, which is easy to maintain and which enables a high rate of production. Another object is to provide a single hydraulic system for selectively moving, positioning and holding a plurality of work carrying cars or carriages to facilitate loading or unloading one car while working on the load of another.

Figure 7:
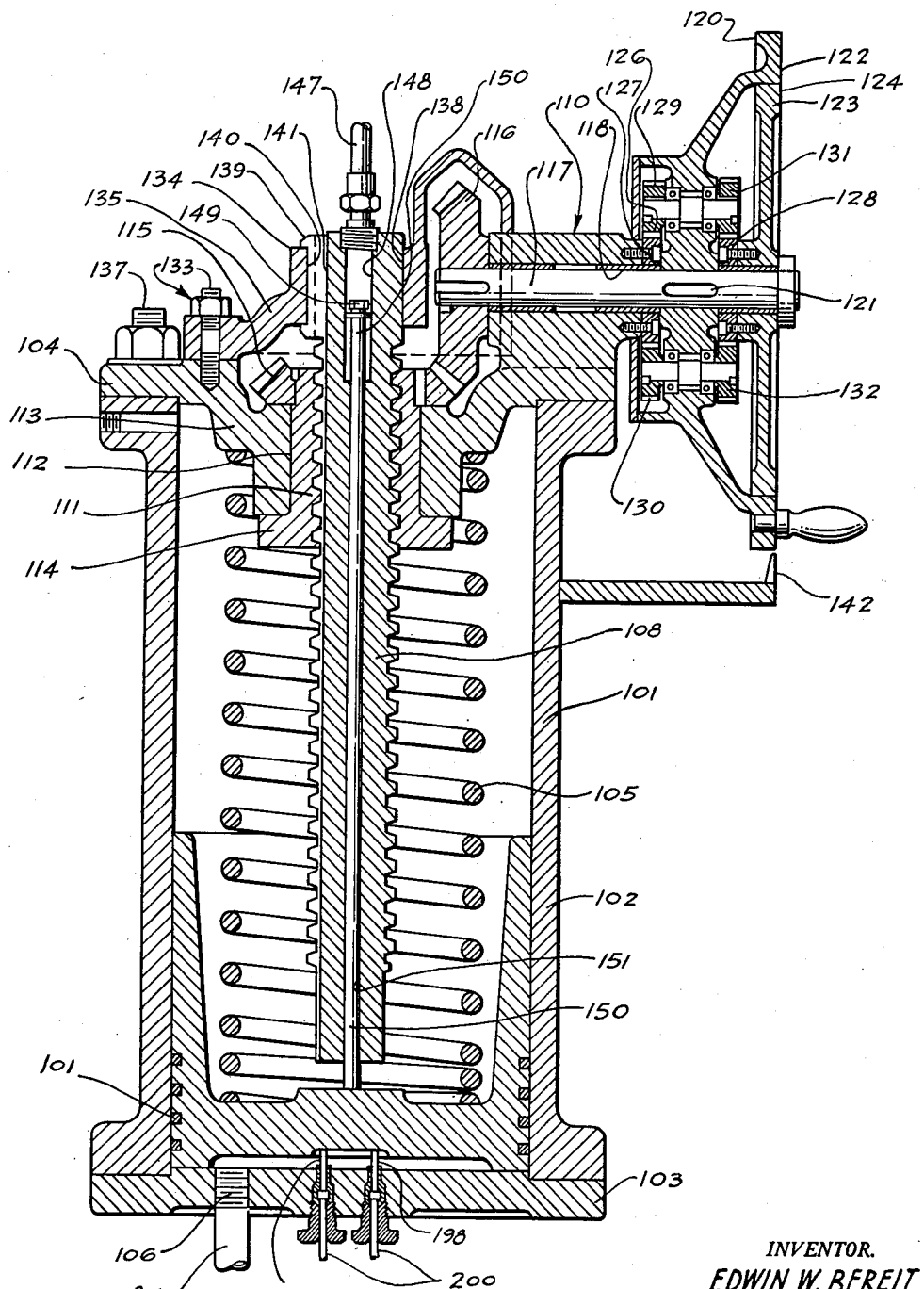
Figure 8:
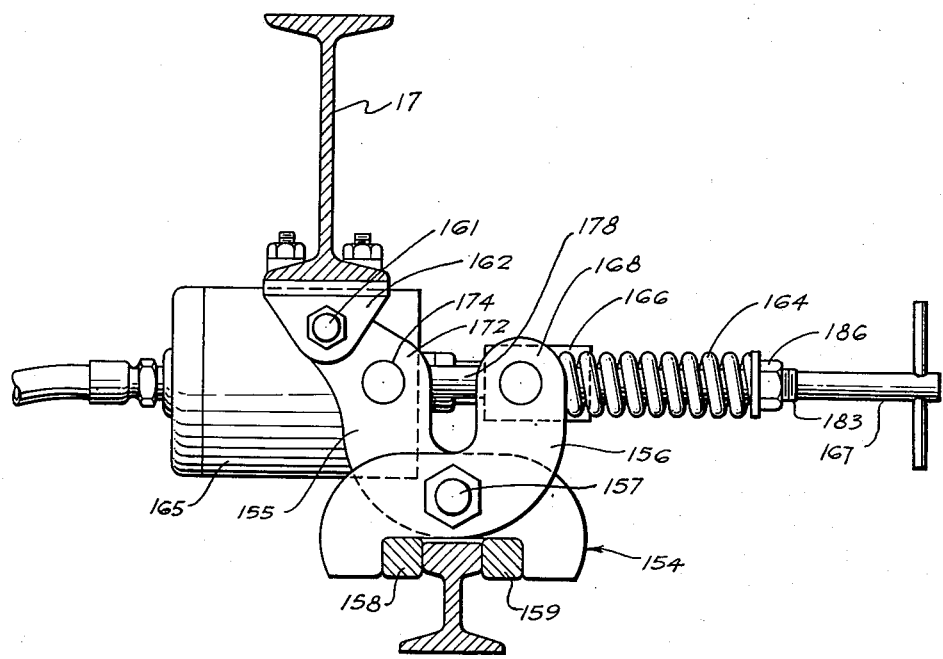
Figure 9:
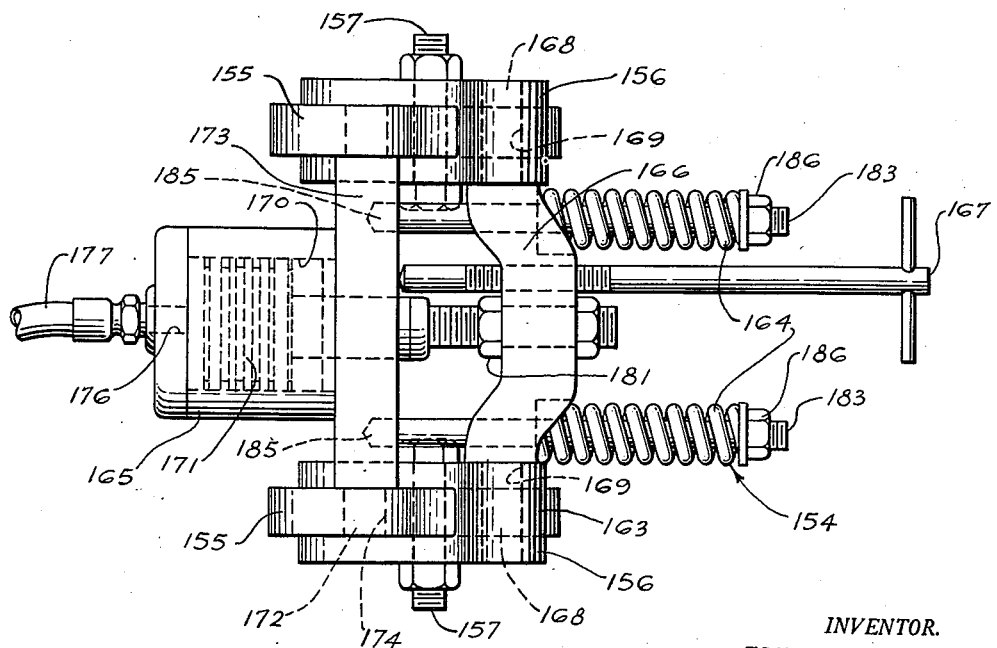
Figure 10:
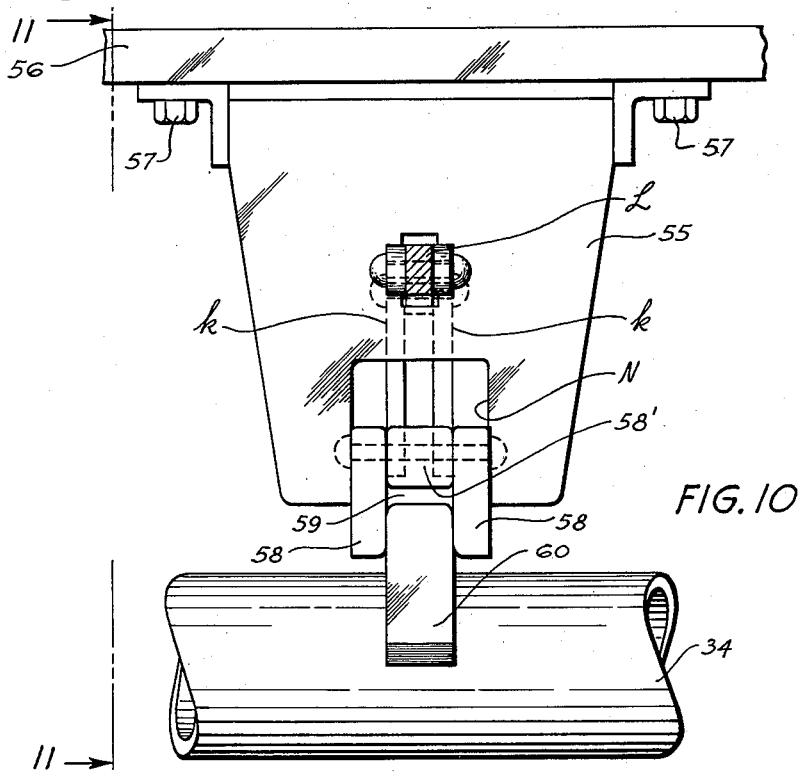
Figure 11:
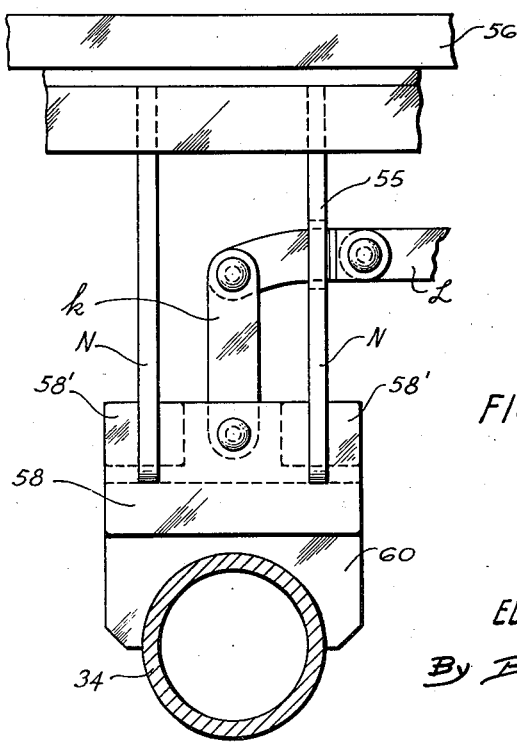

Other objects and advantages will more fully appear from the following description of my invention, reference being had to the accompanying drawings in which Figure 1 is a perspective view of a conventional stone sawing machine with which my invention may be employed; Figure 2 is a longitudinal partly diagrammatic view showing the hydraulic motor for moving the cars; Figure 3 is a transverse sectional view taken in the plane 3—3 of Figure 2; Figure 4 is a transverse sectional view taken in the plane 4—4 of Figure 2; Figure 5 is a fragmentary view of the motor of Figure 2; Figure 6 is a diagrammatic view showing the hydraulic motors with their associated hydraulic system and hydraulic controls; Figure 7 is a longitudinal sectional view of the metering gauge and associated apparatus which controls the flow of exhaust liquid from the hydraulic motor of Figure 2; Figure 8 is an end elevation of the braking device for holding the stone car fixed in position; Figure 9 is a top view of the brake assembly of Figure 8; Figure 10 is a fragmentary side elevation of the driving connection between the car and the positioning motor of Figure 2, and Figure 11 is a view partly in section taken in the plane 11—11 of Figure 10.

A preferred form of my invention is practiced with and comprises hydraulic means together with controls which form the driving, positioning and holding mechanism for the stone cars of an otherwise conventional stone cutting installation and machine. The working stroke of the hydraulic positioning motor is regulated by a metering device which limits the flow of exhaust liquid from the motor to pre-determined measured volumes to govern the extent of the working stroke. Associated throttling means are provided to control the rate of flow of exhaust liquid from the motor and thereby control the speed of the stroke. Spring actuated, hydraulically released car brakes are hydraulically connected to the working side of the car moving motors to hold and release the cars at times complementary to the action of the motors.

My invention is described herein with particular reference to the cross-cutting of stone in which the stone is moved to successive positions where it must remain absolutely stationary in each position while a rotary saw moves across it to cut the stone into the desired lengths. It is to be understood, however, that the invention may be useful in other applications and in the manufacture and processing of other materials which present similar problems.

Referring now to the drawings, Figure 1 shows a more or less conventional stone sawing installation with which apparatus embodying my invention is to be used. The installation consists of a longitudinal bed 10 having a double set of parallel rails 11, 12, 13 and 14 providing tracks 15 and 16 for cars 17 and 18 respectively which carry the stones to be cut. A frame 19 consisting of uprights 20 and 21 and a connecting member 22 extending laterally across the bed provides support for the stone cutting saw 24. The saw 24 together with a suitable driving mechanism is mounted on a carriage 25 which is capable of transverse movement across the bed along a beam 26 of a yoke assembly 27. The yoke is slidably mounted on the uprights and can be raised and lowered to vary the depth of cut of the saw. Appropriate conventional mechanisms and controls for the saw and for raising and lowering the saw are provided and need not be described in detail herein.

In use, one of the cars is loaded with a rough quarried or semi-finished block of stone and is moved along the track into the desired cutting position or positions relative to the saw. The car is held in place and the saw is moved across the stone to make a first cut, which is usually a trimming cut adjacent the end edge of the block. The car is then moved forwardly along the rails the necessary distance to position the stone for the next cut. This is repeated with necessary and desired variations until the stone has been cut into the desired lengths. The car is then moved back and away from the saw for unloading, and the other car which in the meantime has been loaded is moved into the desired positions for cutting as described.

The accuracy with which the stones are cut into lengths depends on the accuracy with which the cars can be moved and positioned. According to my invention the cars are positioned by hydraulic means, which, as illustrated diagrammatically in Figure 6, comprises an hydraulic positioning motor 30 for moving car 17 and a second positioning motor 31 for moving car 18. The motors are preferably operated and controlled by a single control apparatus to which they are alternately connected depending on which of the cars is to be moved. Since the motors 30 and 31 are in all respects identical, only motor 30 and its operation with one of the cars will be described herein, it being understood that the description is also applicable to motor 31 and the operation of the other car. It is also to be understood that while only two rail cars are shown, three or more cars may be provided and operated with equal facility. It may be assumed that the idle car is resting in its loading position with its brake 154′, Figure 6, holding it in fixed position on the rails.

While the positioning motors 30 and 31 may take any one of several forms, the double cylinder and piston arrangement of Figures 2 and 4, in which motor 30 is illustrated, is preferred by reason of its compactness of structure. As shown, the motor 30 is positioned in a trench 32 lying between and below the rails 11 and 12 of track 15 and comprises a movable cylinder 34, having a driving connection with the car 17, as indicated at 35, and a fixed cylinder 36. Pistons 37 and 38 movable within the cylinders 34 and 36 respectively are connected by a piston rod 39 to complete the positioning motor assembly.

In stone cutting practice the blocks of stone are large and the cars must therefore be moved rather long distances. As a result the working stroke of the positioning motors must be correspondingly large. For example, in one installation it is desirable to move the cars a distance of 34 feet. To produce such a car movement with the type of fluid motor shown, the movable cylinder 34 and the fixed cylinder 36 are each approximately 17 feet long and the overall length of the piston rod 39 connecting the pistons is approximately 37 feet long. The motor when fully extended, has a length of 71 feet and when fully telescoped has a length of 37 feet.

It is, therefore, desirable if not necessary to provide support for elements of such length to maintain them accurately aligned, so that they will not bend or sag and so that the motor will not jam in operation.

To this end the motor 30 is supported between a pair of parallel straight channel members 40 and 41 positioned within the trench 32 with their flanges 42, 43 and 44, 45 respectively, extending toward each other, see Figures 3 and 4. The channels are adjustably mounted on fixed supports 46 and 47 in a manner which permits vertical and lateral alignment and adjustment of the channels so that they can be maintained in straight and parallel relationship. The fixed cylinder 36 is supported between the channels by means of blocks 48 positioned between the channels and the cylinder and secured thereto as by bolts 49, see Figure 3. The movable cylinder 34 and the piston rod 39 are supported by the channel members by means of wheels or rollers 50 journalled in pairs on opposite sides of the movable cylinder as at 51, 52 and 53 and centrally of the piston rod as at 54. The wheels engage the flange portions 42—45 of the channels which act as tracks for the wheels as best shown in Figure 4. The channels thus form a rigid, straight, supporting trackway for the positioning motor, keeping the elements in alignment and thus assuring smooth and proper functioning of the motor.

To divorce motor alignment from the conditions of the track 15, debris of the rails and the condition of the wheels of the rail car 17, the driving connection 35 between the rail car 17 and the movable cylinder 34 is designed to permit vertical and lateral motion without longitudinal motion between the movable cylinder and the car. As shown in Figures 10 and 11, the connection takes the form of a depending bracket 55 fixedly secured to the frame 56 of the rail car 17 by bolts 57 and having a pair of laterally extending blocks 58 in its lower portion defining a lateral channel or notch 59. The movable cylinder 34 is provided with a lug part 60 fixedly secured thereto, the lugs 60 being adapted to extend upwardly into the lateral notch 59 of the bracket 55 with a close sliding fit. A vertical clearance between the end of the lug and the bottom of the notch is provided as shown in Figure 10 to permit vertical movement between the bracket and the cylinder lug and the open ends of the notch permits lateral motion between the parts. There is, however, no appreciable clearance between the parts in the longitudinal direction but there is rather a sliding fit so that a positive driving connection without longitudinal play is obtained.

The positioning motor 30 is adapted to drive the car 17 with its load of stone in either direction along the rails as desired. In the description of the construction and operation of the motor 30, which follows, the motor is generally considered as operating in a manner to move the car rightwardly toward the saw as viewed in Figures 2 and 5. In this rightward direction the motor 30 and hence the car 17 are under the control of apparatus, to be described in detail later, which meters the exhaust liquid from the motor and limits the flow of exhaust liquid from the motor to pre-determined measured volumes. Such volumes are measures of the particular stroke of the motor and are indicative of the position of the car. This rightward direction is accordingly called the metering direction for as will be more apparent later, metering is not performed in this preferred form of my invention when the motors move the cars leftwardly after the stone has been cut.

Referring now to Figure 5, which shows the construction of the positioning motor 30, it will be seen that the piston 37 divides movable cylinder 34 into a chamber 61 at the left of the cylinder and chamber 62 at the right of the cylinder and piston 38 divides cylinder 36 into a chamber 63 at the left of the cylinder and chamber 64 at the right of the cylinder. Since for purposes of explanation of metering the stroke the motor is deemed to be moving the car rightwardly as viewed in Figure 2, chambers 62 and 63 are designated as working chambers and chambers 61 and 64 are designated as reaction or exhaust chambers.

The pistons 37 and 38 are connected by the hollow piston rod 39 which has a double tubular form so as to connect the working chambers and the exhaust chambers of the cylinders 34 and 36 respectively. The piston rod has an inner tubular member 65 which extends through the two pistons in the manner shown to provide communication between the exhaust chambers 61 and 64 and has an outer tube 66 coaxial with the inner tube 65 and spaced therefrom to provide an intertubular space 67 providing communication between the working chambers 62 and 63 as shown. The piston rod has a liquid tight sliding seal with the cylinders as provided by cylinder heads 68 and the piston rod members preferably consist of two pairs of tubes joined together as by the coupling 69.

The several hydraulic circuits, the instrumentalities controlled thereby and the controlling instrumentalities are shown diagrammatically in Figure 6. The car moving motors 30 and 31 may be selectively operated in either direction in accordance with the circuits established through the manually operated valve 76, 78 and 80 which selectively direct the liquid under the pressure generated by the pump 71 from the sump 72. Measuring the length between saw cuts is effected by the metering gauge 90 which may be selectively connected into the return line from the reaction chambers of the motors as will be described in greater detail below. The meter 90 may be shunted out through the reset valve 92 when it is desired to advance either of the cars for an unmetered distance or to a preliminary cutting position. The sump 72 is disposed at an elevation above the car moving motors 30 and 31 and above at least the bottom of the metering gauge 90 and preferably as high or higher than the other valves and instrumentalities of the hydraulic circuits so that all of the circuits are under the static head of liquid in the sump whereby to avoid air binding and especially to maintain all parts of the measuring circuits full of liquid especially at the "zero" condition just prior to a measuring operation.

Liquid is taken from the sump 72 by the pump 71, passed through the line 73, through the relief valve 74 which automatically returns liquid to the sump when the system therebeyond refuses liquid, and is conducted through the line 75 to what I call the main by-pass valve 76, the function of which is to selectively direct the liquid under pressure in the "on" position through the line 77 to the direction control valve 78 through which it may flow in various circuits about to be described or in the "off" position to return liquid back to the sump from the pump through the line 152 and at the same time open communication between the line 77 and the sump via the return line 153. The operator may therefore conveniently energize the system or de-energize it through the valve 76 whenever and for whatever purpose he desires according to the setting of the other valves and instrumentalities.

The valve 78, which I choose to call the direction control valve, is so ported and constructed as to receive high pressure liquid from the line 77 and direct it to either of the lines 79 or 83; the line 79 leading selectively via the double valve 80 to the working chambers of one or the other of the motors 30 and 31 via either the lines 81 or 81' to cause rightward motion of the selected motor as for the metered strokes and the line 83 leading to the reaction chambers of the selected motor via either the lines 82 or 82' to cause leftward or return motion of the selected motor. When the valve 78 directs high pressure fluid to the line 79 the line 83 conducts liquid from the reaction chambers 61 and 64, Figure 2, of the selected motor back to the valve 78 which then directs the return flowing liquid to the line 84 whence it flows through the check valve 85, relief valve 86, throttling valve 87 and line 91 either to the metering gauge 90 or back to the sump through the manually operated reset valve 92 via the return line 93. When the direction control valve 78 directs liquid to the line 83 the line 79 conducts liquid from the chambers 62 and 63 of the selected motor back to the valve 78 which then directs the return flowing liquid to the sump via return line 88.

The car selector valve 80 preferably comprises replica right and left half connected for simultaneous actuation; the right half receiving the line 79 and selectively directing liquid therefrom to one or the other of the lines 81 or 81', the former leading to the chambers 62 and 63 of the motor 30 and the latter leading to correponding chambers in the motor 31. The left half of the valve 80 similarly connects the line 83 with one or the other of the lines 82 and 82' leading to the "reaction" chambers respectively of the motors 30 and 31. In one position the valve 80 will establish a complete circuit to and from the motor 30, excluding the motor 31 and in the other position the motor 31 will be served to the exclusion of the motor 30.

In each of the lines 79 and 83 there are disposed like combined throttling and check valves 189. Each valve 189 has parallel passages, one having a check valve that forbids the flow of liquid in a direction away from the car moving motors while permitting free flow toward the motors, the other passage having a manually adjustable orifice or needle valve wherewith to restrict the flow of liquid away from the car moving motors as may be desired to maintain back pressure on the motors, to control or restrict the maximum sustained speed of the car and facilitate the release and maintenance of release of the car brake.

In the operation of the positioning motors the metering gauge 90 is adjusted to receive a definite volume of exhaust oil from the working car motor and the arrangement is such that for any one working stroke oil can be exhausted from the motor only in an amount permitted by the setting of the metering gauge. Thus when the metering gauge is full, oil can no longer be exhausted from the motor and when this occurs the pressure in the exhaust side of the motor will increase to provide a positive stopping force which immediately stalls the positioning motor and stops the car 17 with its load of stone in the proper intended and predetermined position. In essence the metering gauge positions the stone carried by the car by limiting the amount of oil which can be exhausted by the motor which drives the car.

The metering gauge in its preferred form comprises a cylinder 101 having a metering piston 102 movable therein under the influence of oil from the exhaust side of the positioning motor, see Figure 7. The cylinder 101 is closed at one end by an end plate 103 and at the other end by an end plate 104 which also supports an adjusting mechanism, to be described later. The piston always tends to take a certain "zero" position adjacent the inner face of the end plate 103 under the influence of a coil spring 105 which is compressed between the piston and the end plate 104. When oil from the exhaust side of the positioning motor enters the cylinder by the conduit 84 through the port 106 in the end plate 103, it exerts a force against the metering piston 102 which tends to move it upwardly against the force of the spring 105. The upward movement of the metering piston provides additional space for the exhaust liquid and so long as the metering piston is resisted only by the spring 105, it permits operation of the positioning motor and continuing positioning movement of the stone. When the upward movement of the metering piston is arrested, in this case, by abutment with an adjustable stop member 108, the exhaust liquid from the motor can no longer find additional space in the metering cylinder and system and thereupon the exhaust pressure in the motor, therefore, builds up to stall the positioning motor and stop the movement of the stone in its then selected position. Thus the movement of the metering piston 102 is controlled by the stop member 108 in a manner which results in stopping the stone in the position determined by the position of the stop member 108, since it limits the travel of the metering piston, and is thus a measure of the position of the car and the stone carried thereon.

By means of this metering device 90 the stone can be moved from one position to any other desired position within the limits of travel of the positioning motor. Thus, if it be desired to saw a large block of stone which requires the stone to be moved a relatively large distance between cutting positions, the stop member 108 will be withdrawn to permit a large stroke of the metering piston 102, which in turn permits a relatively large working stroke of the positioning motor 30 by allowing a large volume of liquid to be exhausted into the metering cylinder. If a small block of stone is to be cut, the stop member 108 will be moved downwardly to restrict the stroke of the metering piston 102 and correspondingly to curtail the stroke of the positioning motor 30 by permitting only a small amount of exhaust liquid to enter the metering cylinder.

After the piston 102 has made a metering stroke and is held in a raised position by the liquid received in the cylinder, the car moving motor being held in its desired metered position, movement of the valve 76 from "on" to "off" position drops the pressure in the car motor and the system rightwardly, as viewed in Figure 6, of the check valve 85 down to the static head of the sump. Then to return the piston to "zero," i. e. to its initial position adjacent the plate 103, the reset valve 92 is opened and permits the spring 105 to return the piston and return the quantity of liquid theretofore displaced from the car motor back to the sump. Since the sump is at a higher level than at least the lower part of the meter 90 all the space in the system between the face of the piston 102 and the check valve 85 will be filled with the liquid as will the space between the check valve and the proximate faces of the pistons of the car motor so that an exact "zero" condition is re-established from which another car moving stroke can be accurately pre-measured by positioning the adjustable abutment 108. Preliminary to the next measurement the valve 92 will be closed so that the gauge 90 will receive all the discharge from the car moving motor.

Adjustment of the position of the stop member 108 and the correlation of its position with the movement of the stone to a desired new position is provided by an adjusting and indicating apparatus indicated generally at 110 which is mounted on the end plate 104 of the cylinder of the gauge 90. This apparatus preferably takes the form shown in which the stop member 108 comprises a threaded post whose vertical position in the cylinder is adjusted by a means of a threaded nut 111 which can be turned by manual operation of the adjusting mechanism.

The nut 111 is journalled in the central bore 112 of a hub-like portion 113 which forms part of the end plate 104. The nut has a flange 114 at its lower end and a gear 115 at its upper end which projects radially outwardly from the nut to form a second end flange, both end flanges serving to hold the nut to the hub for turning movement without movement in the direction of the axis of the member 108. The nut is turned to adjust the position of the threaded stop member by a gear 116 which meshes with the gear 115 and which is fixedly secured to a shaft 117 journalled in a laterally extending bore 118 provided in the end plate 104. A hand wheel 120 which is keyed to the shaft 117 as at 121 provides the means to turn the shaft 117, the gears 116 and 115 and the nut 111.

The size of the piston 102 and bore of cylinder 101, the pitch of the threads of the nut 111 and stop member 108 and the gear ratio between the gears 115 and 116 are all so related that one complete revolution of the hand wheel 120, see Figures 6 and 7, will change the vertical position of the stop member 1", an amount which will result in a movement of the stone of one foot when the area of the piston 102 is twelve times greater than the effective area of the piston 30 in the reaction chamber 64. The hand wheel is accordingly provided with a circular dial 122 which is graduated to read in inches of car and stone movement and fractions thereof, the whole dial necessarily having a range of 12". I prefer that the dial be a foot or more in diameter so that the graduations representing fractions of an inch are at least $\pi$ times scale and therefore clearly legible for quickly accurate adjustment to very small fractions of an inch. An additional measuring wheel 123 having a dial 124 is provided to record the movement of the stone in feet. The dial 124 has a scale designed to record the total range of metering control in terms of feet of car movement, a range which depends on the capacity of the metering cylinder and the travel of the stop member 108. In the instant example the stop member is limited to a travel of 16", and the range of metering control amounts to 16' of car movement. The dial 124 is therefore divided into 16 equal arcuate sections, each representing one foot of car and stone movement, and is geared to the hand wheel 120 so that 16 revolutions of the hand wheel 120 results in one revolution of the wheel 123 and dial 124.

The wheels 120 and 123 may be linked together in any suitable manner to give the desired ratio. In the present example, this is done by means of an epicyclic gear arrangement comprising a sun gear 126 fixedly secured to the end plate 104 as by pins 127, a second sun gear 128 secured to the inner wheel 123 and rotatable therewith, and coupled pairs of planetary gears 129, 130, 131 and 132, respectively, which are rotatably mounted on each side of the hand wheel 120 and are carried by the wheel, when the wheel is turned, to engage with the sun gears 126 and 128 respectively.

When the hand wheel 120 is turned, the shaft 117 will turn the gear 116 which will turn gear 115 and the nut 111. At the same time the pair of planetary gears 129 and 130 engaging the fixed sun gear 126 will be rotated and will in turn cause rotation of the planetary gears 131 and 132 to which they are coupled. The planetary gears 131 and 132 which engage sun gear 118 will cause rotation of the sun gear and hence rotation of the inner wheel 123. Necessarily the shaft 117 has rotatable sliding movement with respect to the bore of the end plate 104 in which it is journalled and also with respect to the fixed sun gear 126, the rotatable sun gear 128 and the inner wheel 123 to which gear 128 is affixed.

In order that rotation of the nut 111 will result in vertical movement of the stop member 108 it is necessary to restrain the stop member against turning with the nut. To this end, the stop member is supported by the hub portion 134 of a member 135 which is secured to the end plate 104 as by bolts 133. The hub 134 comprises a sleeve having a central bore 138 of a diameter corresponding to the diameter of the threads of the stop member 108 and of appreciable length so as to lend support to the stop member. A key 139, fitting within appropriate longitudinal slots 140 and 141 in the hub and in the stop member respectively, holds the stop member against rotation while permitting longitudinal movement thereof. With this arrangement, when the hand wheel 120 is turned, the stop member 108 will move up or down to an extent determined by the extent of rotation of the hand wheel.

To set the gauge initially to zero position, both the outer "inch" wheel 120 and inner "feet" wheel 123 are moved so that a pointer 142, provided for that purpose, indicates zero on each dial. The key 139 which holds stop member 108 is then removed and the stop member is screwed down through the nut 111, which is held against turning by holding the hand wheel stationary, until the stop member contacts the piston 102 in its lowermost position. The key 139 is then inserted in the slots to secure the stop member against rotation. Operation of the hand wheel thereafter will enable the gauge to be set for any desired positioning movement of the stone.

Thus in order to saw a block of stone having a length of 8' 4", the block must be moved through that distance after it has had its first trimming cut. This is done by turning the outer "inch" wheel 120 somewhat more than eight revolutions until the inner "feet" dial reads approximately 8⅓' and the outer inch dial reads exactly 4" as indicated by pointer 142. This brings the stop member 8⅓" from the piston 102 and it is then in correct position to stop the metering piston when just the exact amount of liquid has been exhausted from the chamber 64 of the positioning motor to give the stone the desired movement of 8' 4".

As mentioned above, the high inertias encountered in moving large masses of stone present a severe problem of moving the load and bringing the stone to rest in precisely the desired position. Means are incorporated in the present apparatus in conjunction with the metering gauge to aid in the solution of this problem. To this end the valve 87 is inserted in the conduit 84 so that under some conditions it will throttle the flow of exhaust liquid from the exhaust chamber 64 to the meter 90. The valve 87 is normally open but is controlled preferably by a closed hydraulic system which acts to close the valve progressively as the metering piston 102 approaches the stop member 108. By the time the piston actually abuts the stop member, the valve 87 will have progressively throttled the flow of liquid to the cylinder 101 so that the speed of movement of the load will be reduced almost asymptotically until it is brought to a dead stop.

In my preferred construction, the valve 87 comprises a normally open valve, the plunger of which takes its position in accordance with the action of a more or less conventional hydraulic valve motor indicated at 146. A flexible fluid conduit 147 leads from the valve motor 146 to communicate with a longitudinal counterbore 148 in the stop member 108. A piston 149 is movable within the counterbore and has a rod or plunger 150 at one end which extends through a central bore 151 in the stop member and which projects out from the end of the member preferably about 3" when the piston 149 takes its lowermost position in the counterbore 148. The conduit 147 is filled with a liquid which is under a pressure determined by the force of the spring of the fluid motor 146 of the throttling valve 87 and this pressure normally forces the piston and rod to the lowermost position with the plunger 150 extending beyond the lower face of the stop member.

When the metering piston 102 moves upwardly toward the stop member 108 in response to the force of exhaust liquid from the positioning motor, the piston initially travels at its full speed, for at that time the exhaust liquid flows outwardly from the positioning motor without restriction from the valve 87. During this interval the stone is also moving at full speed as the operator determines or has determined by adjustment of the throttling valves 189. When the metering piston strikes the rod or plunger 150 it will move it and the piston 149 upwardly, to increase the pressure of the liquid in the throttling valve motor 146 and the increased pressure acts to move the valve 87 toward its position of minimum opening and progressively throttle the flow of exhaust liquid from the reaction chamber of positioning motor. In this way the rate of movement of the car moving motor and of the stone is begun to be retarded and increasingly retarded as the load approaches the intended limit of travel. As the metering piston 102 continues to force the plunger 150 upwardly and inwardly in the stop member, the valve 87 is correspondingly and progressively moved to further throttle the flow of exhaust liquid from the positioning motor to a greater and greater extent. Since the rate of movement of the stone depends upon the rate at which the liquid can be exhausted from the main positioning motor, the rate of movement of the stone is thus gradually slowed down. The throttling valve 87 in restraining the flow of exhaust liquid thus effectively decelerates the speed of the stone so it can be brought to a stop in the desired position without subjecting the apparatus to deleterious mechanical or hydraulic shock, thus avoiding over-running or rebound or other cause of error in positioning the stone. Even when the metering piston 102 is finally stopped by the stop member, the throttling valve will still remain open a small amount, thus insuring that the throttling valve will not prematurely cut off the flow of exhaust liquid to halt the action of the positioning motor and bring the stone to a stop short of the desired position before the metering piston abuts the stop member. The control which the stop member 108 has over the motor 30 and thus over the final position of the stone is thus preferably never wholly relinquished to the throttling valve 87.

In practice the plunger 150 may extend beyond the stop member a distance of about 3" which corresponds to about 3' of stone movement so that the stone will move at full speed until its last 3' of travel, at which time the metering piston will strike the plunger and the stone will begin to be slowed down. Thus if a load of stone is to be moved from one position to another through a distance of say 5½', the stone will be free to move at or be accelerated to or toward approximately full speed for 2½' and then will begin to be slowed down gradually and progressively in its last 3' of travel. This manner of deceleration yields the advantages above described without significant loss in speed of production. The length of stroke devoted to deceleration, i. e. the rate of deceleration may, of course, be modified with respect to the inertia of the load as may be found most advantageous.

Between the check valve 85 and the decelerating valve 87 I provide an emergency relief valve 86 in the line 84 which, should the pressure in the line 84, gauge 90, etc. rise to an abnormally high amount, would open communication between the line 84 and gauge 90 through valve 86 and line 86a to the sump. If, for example, the decelerating valve 87 should fail to function and the car with a heavy load should be moving at full speed when the piston 102 contacted the abutment 108, the full energy of the moving mass would be imposed on the gauge and the motor exhaust system with results that might well be gravely injurious. To avoid injury in such circumstances the relief valve 86 is set to "unload" this part of the system and divert fluid to the sump whenever the pressure in the line 84 and gauge 90 exceeds a safe limit. If maximum pump pressure is chosen at about 250#/square inch, then in this form of my invention safety is insured against the risk mentioned if the valve 86 relieves the line 84 at about 400#/square inch, which is a value safely above any normal pressure experienced in the line 84 and gauge 90 in the normal operation of my invention.

When a positioning stroke of the positioning motor has been terminated by the metering gauge 90 in the normal manner described above, with the car and load stopped in the desired position, it is also eminently desirable to insure that the stone will not shift position during the sawing operation. To this end I provide for the simultaneous application of a rail gripping brake 154, Figure 8, with an initial reduction in working pressure in the motor 30 and then the substantially complete reduction in pressure in the motor to prevent the motor from working at any odds with the brake when the car and stone are intended to be secured in absolutely fixed position during the cutting operation. After the gauge 90 stops the car the pressure in the hydraulic positioning motor is reduced by moving the by-pass valve 76 to "off" position to connect the working chamber of the motor 30 and the pump 71 directly to the sump 72 through conduits 153 and 152. Directly the working pressure in the working chambers of the motor fails substantially, the brake 154, Figures 3 and 9, is applied by the action of the springs 164 overcoming the reduced pressure in the brake motor 165 and causing the jaws of the brake to grip the rail head and positively lock the car in fixed position. Thereafter the pressure in the working chambers of the motor 30 continued to fall to a very small or negligible pressure as does also the pressure in the reaction chambers of the motor so that the motor exerts no significant influence tending to move the car while the brake is applied. For example, if the working pressure in the working chambers of the motor 30 is of the order of 125 to 200 pounds per square inch when the car is stopped my preference is that the springs and fluid motor of the car brakes be adjusted to cause the brakes to begin to grip the rails firmly when the fluid pressure has dropped to about 90 pounds per square inch. Then during the "braked" condition I prefer that the pressure in the motor 30 be dropped down to approximately a static head of only two or three feet, i. e. at approximately the level of the sump 72 above the positioning motors wherewith to keep the system full of liquid but without exerting significant car moving pressures in the motor.

The brake 154 comprises clamping members which normally are held in open position by an hydraulic motor 165 operated by the working pressure of the positioning motor via line 177, see also Figures 2 and 6, but which are moved to clamping position by powerful springs 164 which take effect whenever the force exerted by hydraulic motor 165 becomes less than that of the springs. Thus so long as the positioning motor 30 is driving the stone car and thus is subjected to normal working pressure the brake is released. When, however, the car is stopped and the pressure in the positioning motor is begun to be reduced by opening the by-pass valve 76, the springs will operate the brake to grip the rail before the motor 30 and gauge 90 yields their control of the position of the car.

The brake in its preferred form comprises two pairs of crossed and pivotally connected links 155 and 156 secured to car 17 and positioned adjacent to and longitudinally spaced along the rail 15, as best shown in Figure 8. The links are pivotally connected intermediate their ends as by bolts 157. The lower ends of the links lie on opposite sides of the rail and are notched as at 158 to receive longitudinally extending shoes 159 which lie closely along the sides of the rail head and are adapted to grip the rail when the brake is operated. The brake is secured to the frame of the car 17 by bolts 161 which pass through holes in the upper ends of the links 155 to hold the links to brackets 162 which in turn are secured to the frame of the car. The links 156 comprise a pair of similarly shaped plates spaced apart by blocks 162 secured to the plates at their ends. The links 155 take the form of curved flat straps of metal adapted to extend between the plates of links 156. By this interfitting construction the links mutually support each other and a strong and rigid structure is obtained.

In operation, the links are movable into and out of clamping position alternatively by the force of a pair of springs 164 or by the force of an hydraulic motor 165 which opposes the springs. The springs and the motor are supported by the links 155 and both act upon the links 156 through a cross-member 166 which connects the links and transmits the forces thereto. The cross-member 166 may be secured to the links in any convenient manner but it is preferred to have the cross-member terminate in trunnions 168 which engage holes 169 in the links 156.

The hydraulic motor 165 comprises a cylinder 170 and a piston 171 movable therein and is secured to the links 155 by means of trunnions 172 integral with the forward cylinder head 173 and extending through holes 174 in the links. The piston 174 moves within the cylinder 170 in response to the pressure of liquid which enters the cylinder through the port 176 in the rearward cylinder head from the conduit 177 which communicates with the working chambers of the positioning motor 30. A piston rod 178 extends from the cylinder and terminates in a threaded end which extends through the cross-member 166 and is secured thereto as by lock nuts 180 and 181 on each side of the cross-member. It is apparent that when the liquid pressure in the cylinder is high, the piston 171 will take an extreme rightward position to force the cross-member away from the cylinder, thus spreading the links apart and moving them into non-clamping position.

The springs 164 are mounted on threaded rods 183 which engage threaded holes 184 in the cylinder head 173. The rods extend freely through holes 185 in the cross-member 166. The springs fit over the rods and are compressed between the cross-member and nuts 186 which lie at the ends of the studs. It will be apparent that the springs bear upon the cross-member 166 in a manner to close the links together into clamping position to grip the rail. The force exerted by the springs on the links is thus opposite to that exerted by the cylinder and piston. The springs can be adjusted by turning the nuts 186 more or less in upon the rods 183 so that their exerted force is less than that of the motor 165 when the liquid pressure in the cylinder 170 is at full working pressure. Under such conditions, the springs are ineffective to operate the brake to clamp the rail. When, however, the pressure in the motor 165 falls off, as when the pressure in the positioning motor 30 is reduced as from about 125# to about 90#, the springs then are able to move the links together to grip the rails; the grip increasing as the pressure continues to fall.

The manner of supporting both the cylinder and the cross-member on links by means of trunnions enables the parts to maintain their alignment for all positions of the links and reduces substantially any danger of binding or jamming. While I have described the brake 154 and its relation to the motor 30, it will be understood that a similar brake 154' is provided for the car operated by the motor 31 in the same relation thereto.

The dependence of the brake for its release upon the existence of a substantial high pressure in the working chambers of the car moving motor not only facilitates retention of accurate controlling and positioning of the car in and incident to stopping and holding it but similarly participates or potentially participates in the orderly starting and moving thereof. This participation is in turn facilitated by the maintenance of an appropriately high back pressure in the reaction chambers of the car moving motor, other than when deceleration is being effected by the valve 87, as by the throttling valves 189 which are preferably manually adjustable to restrict the flow from the reaction chambers to the metering gauge, thereby requiring the working pressures to rise to desirably high values in excess of brake releasing pressures to move the car at a desired maximum rate of speed as well as to control and maintain substantially constant the maximum speed of car movement. In starting, the inertia of the load tends to afford ample resistance to movement of the piston of the car moving motor to build up the desired pressure in the working chambers to release the car brake. The brake itself also requires that at least brake releasing pressures be established and maintained in the working chambers of the car moving motor to tend to move the car. Any tendency of the car to overrun its intended movement or rate of movement as the same might be reflected in a falling off of pressure in the working chambers also tends to induce a complementary restraint from the brake. Since the restricted orifice part of the valve 189 in the line 79 maintains the desired back pressure on the return or non-metered stroke of the car moving motors the operation including the functioning of the brake and the speed of car movement on the return stroke can be adjusted to have the same or substantially the same desirable characteristics as on the forward or metering stroke. Back pressure which at once restrains car movement and facilitates brake operation is also provided at the limits of car travel through cam actuated throttling decelerating valves 191, 192, 196 and 197, see Figure 6.

In operation it has been found desirable to decelerate the cars at the extremes of travel of the positioning motor movement, to protect the apparatus against the shock incident to stopping the cars and loads. Preferably this is done by means of more or less conventional cam operated decelerating valves which are effective to slow down the apparatus in about the last or extreme three feet of car travel in both directions. Such decelerating valves, indicated at 191 and 192 in the diagrammatic arrangement of Figure 6, are arranged in the conduits 81 and 82 leading from the motor 30. Between the extreme ends of car and motor travel the valves are wide open and exert no influence on the passage of exhaust liquid. However, in the last few feet of car movement cams, not shown, fixed to and carried by the car 17 act to operate the valves to throttle the flow of exhaust liquid from the motor 30, thus progressively slowing up the car 17 and gradually and smoothly bringing it to a stop. Similar valves 196 and 197 are also provided for motor 31 and are operated by cams secured to car 18. The valves 192 and 196 in the lines 82 and 82' throttle the flow on the reaction side of the system when the cars are at or approach the extreme "rightward" limit of their travel at which time the valves 191 and 197 are in their wide open position, the actuating cams being carried by the cars, so that the flow of car moving fluid passing through the line 81 or 81' is not impeded. Opposite conditions prevail when a car is at the extreme "leftward" limit of its travel. All these decelerating valves are constructed or adjusted to be closed positively at the extreme desired limit of car travel to positively limit car movement and the desired limit of car travel. All these decelerating valves are provided with check valve controlled shunt passages to admit full flowing operating fluid and pressure when the circuits are reversed to start a car from either extreme position for movement toward the other and opposite end of the track on which it moves.

In operation the movement of the cars 17 and 18 in the metering direction is normally controlled by pre-setting the metering gauge, and the movement in the opposite direction is manually controlled by the operator. However, if desired, the operator can take over control in the metering direction also by rendering the metering gauge ineffective. Furthermore the operator may whenever he desires move the car by moving the gauge, and by turning the gauge wheel slowly or just in advance of the car position, "inch" the car along to any desired position at any speed less than maximum. Thus assume that car 17 is loaded with stone and is to be moved beneath the saw to be cut into blocks of desired length. Valve 80 is set to deliver oil to motor 30, valve 78 is adjusted so that car 17 will move rightwardly and by-pass valve 76 is then turned to "on" position so that the pump 71 will deliver operating liquid under pressure to the working chambers 62 and 63 of the motor 30. To move the car initially the operator may manually hold reset valve 92 open, permitting the exhaust oil to by-pass the metering gauge 90 to flow directly to the sump. When the car is correctly positioned for the initial trimming cut the car may be stopped by closing the valve 92. Such closing should be gradual and discrete for the reasons discussed herein. The by-pass valve 76 is then opened to relieve the pressure in the positioning motor and in the brake. The spring brake thereupon clamps the rails and the stone is held securely in place for the sawing operation. While the sawing operation is proceeding, the metering gauge is set for the next movement of the car and load by adjusting the position of the stop member 108 with the hand wheel 120. Moving and stopping the car by opening and closing the reset valve 92 alone, even when little exactitude is sought or required for preliminary positioning of the load suggests that other advantage can be taken of my invention even for such preliminary movements. For example, when it is desired to bring the stone to position for a first cut it is preferable that the gauge 90 by the hand wheel 120 be set for about a 3' movement before the main by-pass valve 76 is moved from the "off" to the "on" position. Then after turning the valve 76 to the "on" position the gauge 90 will just begin to constrain the outflow from the car moving motor through the decelerating valve 87 whilst the valve 92 is being opened, but directly the valve 92 is opened, full flow to the sump through the lines 84, 91 and 93 is permitted letting the car attain its maximum speed, if desired, until it moves the stone to a position preferably about 4' from the saw. Then even abrupt closing of the valve 92 will merely divert exhaust liquid into the gauge 90 to begin to raise the piston 102 from its lowermost position and by virtue of the setting of the gauge will begin the smooth deceleration of the car and load through the decelerating valve 87. Then the operator, with his hand on the wheel 129 and the car and load approaching the saw and decelerating, as if to come to rest about 1' short of the desired position for a first trimming cut, may ease the car very very slowly up to the precise position he desires by moving the hand wheel, either stopping and starting the car or continuing its movement at the least appreciable speed to the exactly desired position.

After the trimming cut is made, the stone is ready to be moved to the next required position, i. e. to the exact desired metered distance required from the first cut. The gauge having been set for this exact travel during the cutting operation, the by-pass valve 76 is turned to the "on" position connecting the pump to the car motor. During the trimming and all other cuts the gauge 90 is reset by draining out all liquid from the cylinder 101 that displaced the piston from its lowermost position through the reset valve 92. With reset valve 92 closed all the exhaust oil displaced from the reaction side of the system passes directly to the metering gauge 90 and continues to flow under appropriate influence from the decelerating valve 87 until the gauge is filled to the selected measured capacity, at which time the motor 30 and the car are positively stopped as above described. The car has then been moved the proper distance and is then in correct position for the next sawing operation. By-pass valve 76 is turned to the "off" position, connecting the motor and pump to the sump, reducing the pressure in the motor and once again setting the brake 154. The stone is then again ready to be cut to the measured length. While this second cut is being made the reset valve 92 is opened to permit the spring 105 of the metering gauge to again empty the gauge and make it ready for another metering cycle, and the gauge is again adjusted, if need be, by means of hand wheel 120 for the next positioning stroke. So long as the hand wheel is not moved succeeding strokes will be measured at the same lengths. Once the metering gauge has been emptied the reset valve is closed and the apparatus is again ready for another car moving and positioning cycle. I prefer to provide electrical contacts 198 preferably carried in the cylinder head 103 which close an electrical lighting circuit, including conductors 200 when the piston 102 reaches its lowermost position in the gauge cylinder 101 wherewith to give visual evidence that the gauge has discharged the measured quantity of liquid received on a preceding stroke and has been reset for accurate measurement of a new stroke to be measured.

Against the possibility that liquid may in time accumulate above the piston 102 in the cylinder 101, whether from leakage past the pistons 102 or 149 or from lubrication of the gauge mechanism, I provide an overflow return 199 leading to the sump via line 93 from the upper part of the cylinder 101 so that upward movement of the piston will never be restrained other than as desired through the stop 108. Preferably a check valve 94 permitting liquid to flow only from the valve 92 toward the sump is disposed in the line 199 at or near its junction with the line 93 to prevent liquid from flowing toward the gauge from the line 93 or valve 92 at any time. The check valves 85 and 94 preserve the desired "zero" quantity and head of liquid in the gauge and gauge circuit.

As shown diagrammatically in Figure 6, I provide a separate liquid reservoir 95 above the gauge 90, communicating with the line 147 through check valve 96 to maintain liquid in the motor 146 of the valve 87 and above the piston 149 to insure correct operation of the valve 87 as above described. The sump 72, as mentioned, stands at an elevation above the level of the liquid circuits, motors and valves, but conveniently not as high as the reservoir 95, wherewith to maintain a static head on the whole system. To insure the absence of air or bubbles I prefer to employ a bubble free liquid and I also provide manual bleeder valves, not shown, at appropriate high points in the system to permit bleeding when filling the system in the first instance and from time to time as prudence and experience suggest.

There may be occasions when it is desired to move both cars together at the same time, as for example when it is desired to move and cut an unusually large stone. On such occasions I prefer to latch the two cars 17 and 18 together, side by side, by conventional latching or connecting means, not shown, and drive both cars by one motor under the control above described. To facilitate this mode of operation I prefer to provide manual means to disconnect the off car from its motor and to release its rail engaging brake. Assuming both cars 17 and 18 are thus to be driven, positioned, etc., by the motor 30 acting directly on the car 17, the brake of the car 18 will first be manually released by turning the hand operated screw 167, Figure 9, to spread the brake shoes 159 to an idle position. At about the same time the car 18 will be manually disconnected from its driving motor by the illustrative means shown in Figures 10 and 11 wherein the blocks 58 spaced and secured through spacers 58' may be raised out of engagement with the driving lug 60 up into the elongated notches N in the plates 55 by the manually operable lever L pivotally supported on one of the plates 55 and connected to the blocks 58 by the links K. Thereafter the operation described above for moving positioning and holding the car 17 will pertain to the joint movement of both the cars 17 and 18.

Other movements and combinations of movements of the cars and stones carried thereby will be evident from the preceding description of my invention. A recapitulation of a few mathematical values and relationships that I have found practicable and advantageous may illumine certain aspects of the operations. To handle stone loads of the order of 20 or 30 tons per car, I have employed a pump capable of maintaining a pressure of 250#/square inch at the relief valve 74 and delivering liquid at a rate sufficient to move the loaded car or cars at a maximum speed of about 44 ft./min. as controlled by the valves 189. This was done with the effective areas on the "working" faces of the main motor pistons measuring about 6 square inches and the effective areas on the "reaction" side of those pistons measuring about 12½ square inches. I estimate that about 125#/square inch in the working chambers is sufficient to move the loaded cars at uniform speed; the greater pump pressures being available for starting and advantageous acceleration and the difference lost or available to be lost in line friction. It may be noted in passing that the throttling valve 189 in the line 79 is set to have a considerably smaller orifice opening than in its companion in the line 83 to give the same car speed on the return stroke as on the forward, rightward as viewed in Figure 2, stroke, since less fluid at a higher pressure is discharged from the car motor on the return stroke than on the forward stroke.

I have found it convenient to make the area of the metering piston 102 in this installation about 151 square inches wherewith to constrain its travel within convenient limits and give fair compactness to the gauge relative to the size and stroke of the car moving motors.

In sum my method and mechanism offers much flexibility of operation and purpose, great facility and accuracy of measurement, much safety and security in all aspects of the work to be done, many savings in operation, not only in time for moving and positioning the loads but also in prevention of waste and prevention of injury to the saws and attendant devices. Moreover my invention eliminates many of the hazards to human life and limb heretofore attendant upon work of this nature and relieves the work of much of the manual effort as well as the human errors incident thereto.

Changes in and modifications of the preferred form of my invention herein illustrated and described will be apparent to those skilled in the art without departing from the spirit of my invention as set forth in the teachings herein, and therefore I do not care to be limited in the scope of my patent to my preferred form or forms nor in any manner inconsistent with the advance which my invention has made in the art.

I claim:

1. Apparatus for cutting stone including a work supporting car movable on rails, a stone cutting tool movable transversely of the path of movement of said car during cutting of the stone, means successively to precisely move said car to and to stop said car at pre-determined positions relative to said tool comprising a hydraulic positioning motor connected to said car, a pump adapted to deliver liquid under pressure from a reservoir to operate said motor and move said car, a metering gauge of adjustable air-free volume adapted to receive exhaust liquid from said motor and to limit the flow thereof to the volume of said gauge whereby to precisely limit the working stroke of said motor, said metering gauge comprising a cylinder, a metering piston movable in said cylinder, a spring urging said metering piston toward one end of said cylinder, said piston being movable away from said end of said cylinder by exhaust liquid from said motor, a stop member to limit the movement of said metering piston away from the end of said cylinder, and means to precisely adjust the position of said stop member.

2. Apparatus for cutting stone comprising a stone carrying car, a stone cutting tool, and means to move the car to precisely to pre-determined succcessive positions relative to said tool, comprising a hydraulic positioning motor having a movable cylinder connected to said car, a fixed cylinder aligned with said first cylinder, pistons movable in each cylinder and dividing said cylinders into working chambers and exhaust chambers, a hollow piston rod comprising two coaxial spaced tubular members connecting said pistons and providing communication between the working chambers and the exhaust chambers of said cylinders respectively, means to deliver liquid under pressure from a reservoir to said motor to operate said motor and move said car, a metering gauge of adjustable air-free volume adapted to receive exhaust liquid from said fluid motor and to precisely limit the amount of liquid exhausted from said motor.

3. Stone cutting apparatus comprising a car movable on rails for supporting stone to be cut, a stone cutting tool movable on cutting strokes transversely of the path of movement of said car, means to move said car to and stop said car at pre-determined successive positions with respect to the path of movement of said tool, a hydraulic motor having a driving connection with said car, said motor having a working chamber and an exhaust chamber, a pump adapted to deliver liquid under a working pressure from a reservoir to said working chamber, metering means having an adjustable air-free volume communicating with said exhaust chamber adapted to receive exhaust liquid from said motor and to limit the flow of exhaust liquid from said chamber to amounts equal to the volume of said metering means whereby to limit the working stroke of said motor, and means controlled by the volume of said exhaust liquid exhausted to throttle the flow of liquid from said exhaust chamber to reduce the speed of said motor when the motor approaches the end of said working stroke, means selectively connecting said motor to said reservoir whereby the pressure in said motor may be reduced to substantially zero, and means selectively connecting said metering means with said reservoir, whereby said metering means may be evacuated.

4. Apparatus for cutting stone comprising a car movable in one direction for carrying stone, a stone cutting tool movable on cutting strokes transversely of the direction of movement of said car and means to move said car to and to stop said car at precisely pre-determined positions relative to the path of movement of said cutting tool, comprising a hydraulic motor connected to and adapted to move said car, means to deliver liquid under pressure to operate said motor, means having an adjustable air-free volume connected to said motor and adapted to receive exhaust liquid from said motor and adapted to precisely limit the amount of liquid exhausted from said motor, and manually operable means to expand said volume to induce continuing operation of said motor.

5. Stone cutting apparatus comprising a stone cutting tool, a car movable on rails for carrying stone into pre-determined successive positions with respect to said tool, a hydraulic motor having a driving connection with said car, said motor having a working chamber and an exhaust chamber, a pump adapted to deliver liquid under a working pressure from a reservoir to said working chamber, metering means having an air-free volume communicating with said exhaust chamber adapted to receive exhaust liquid from said motor and to limit the flow of exhaust liquid from said chamber to amounts equal to the volume of said metering means whereby to limit the working stroke of said motor, means controlled by the volume of said exhaust liquid exhausted to throttle the flow of liquid from said exhaust chamber to reduce the speed of said motor when the motor approaches the end of said working stroke, means selectively connecting said motor to said reservoir whereby the pressure in said motor may be reduced to substantially zero, means selectively connecting said metering means with said reservoir, whereby said metering means may be evacuated, and brake means comprising a pair of members supported on said car and adapted to clamp onto one of said rails to hold the car in place, spring means urging said members into clamping position and hydraulic means opposing said spring means urging said members out of clamping position, said hydraulic means having communication with said motor and being effective to oppose said spring means when said motor is subjected to full working pressure and being ineffective to oppose said spring means when said motor pressure is reduced below working pressure.

6. Mechanism for controlling the movement of an object from one position to another precise preselected position comprising means exerting a force of limited value to move said object, a hydraulic pump actuated by movement of said object and delivering liquid in proportion to the movement of said object, a liquid-full expansible and adjustable system hydraulically connected to said pump in which expansion is effected by the liquid delivered by said pump in proportion to the movement of said object, and means for selectively limiting expansion of said system to predetermined amounts and thereby correspondingly measure and limit the movement of said object, said liquid-full expansible and adjustable system comprising a metering gauge, a conduit line connecting said gauge to said pump and a throttling valve in said conduit line between said pump and said metering gauge, said metering gauge comprising a cylinder, a metering piston movable in said cylinder, a spring urging said metering piston toward one end of said cylinder, said metering piston being movable away from said end of said cylinder by the liquid delivered by said pump, a stop member to limit the movement of said metering piston away from the end of said cylinder, means to adjust the position of said stop member, a rod extending through and beyond said stop member so as to be actuated by said metering piston as it is moved toward said stop member by said liquid, said rod when actuated causing an independent hydraulic system to actuate said valve and increasingly throttle said liquid as the volume of said liquid entering said cylinder approaches the total volume of said liquid to be metered.

7. Apparatus for cutting stone including a work supporting car movable on rails, a stone cutting tool, means successively to move said car to and stop said car at precisely pre-determined positions relative to said tool comprising a hydraulic positioning motor connected to said car, a pump adapted to deliver liquid under pressure from a reservoir to operate said motor and move said car, a metering gauge of adjustable air-free volume adapted to receive exhaust liquid from said motor and to limit the flow thereof to the volume of said gauge whereby to precisely limit the working stroke of said motor, a conduit line connecting said gauge to said pump and a throttling valve in said conduit line between said pump and said metering gauge, said metering gauge comprising a cylinder, a metering piston movable in said cylinder, a spring urging said metering piston toward one end of said cylinder, said metering piston being movable away from said end of said cylinder by the liquid delivered by said pump, a stop member to limit the movement of said metering piston away from the end of said cylinder, means to adjust the position of said stop member, a rod extending through and beyond said stop member so as to be actuated by said metering piston as it is moved toward said stop member by said liquid, said rod when actuated causing an independent hydraulic system to actuate said valve and increasingly throttle said liquid as the volume of said liquid entering said cylinder approaches the total volume of said liquid to be metered.

8. Stone cutting apparatus comprising a stone cutting tool, a car movable on rails transversely of the plane of cutting for carrying stone into pre-determined successive positions with respect to said tool, a hydraulic positioning motor connected to said car, a pump adapted to deliver liquid under working pressure from a reservoir to said motor to operate said motor and move said car, a metering gauge of variable pre-determinable air-free volume adapted to receive exhaust liquid from the exhaust side of said fluid motor, and brake means comprising a pair of members supported on said car and adapted to clamp onto one of said rails to hold the car in place, spring means urging said members into clamping position and hydraulic means opposing said spring means urging said members out of clamping position, said hydraulic means having communication with said motor and being effective to oppose said spring means when said motor is subjected to full working pressure and being ineffective to oppose said spring means when said motor pressure is reduced below working pressure.

9. In apparatus for cutting stone, a car movable on rails for supporting stone to be cut, a stone cutting tool movable on cutting strokes transversely of the path of movement of said car, means to move said car successively to and stop said car at precisely predetermined positions relative to said cutting tool comprising an hydraulic positioning motor operatively connected to said car, means to deliver liquid under pressure to operate said motor, chamber means having an expansible air-free volume connected to said motor to receive exhaust liquid from said motor and adapted to restrict the amount of liquid exhausted from said motor to precisely predetermined measured amounts, and brake means operably responsive to the decrease in pressure of liquid in said motor to hold said car in fixed position when said motor is not activated to move said car.

EDWIN W. BEREIT.

REFERENCES CITED

The following references are of record in the file of this patent:

UNITED STATES PATENTS

| Number | Name | Date |
|---|---|---|
| 578,429 | Theil | Mar. 9, 1897 |
| 651,502 | Fitzgerald | June 12, 1900 |
| 1,895,732 | Rosenkranz | Jan. 31, 1933 |
| 1,912,184 | Ferris et al. | May 30, 1933 |
| 2,012,273 | Fraser | Aug. 27, 1935 |
| 2,166,423 | Clark | July 18, 1939 |
| 2,285,069 | Vickers | June 2, 1942 |
| 2,323,731 | Shetzline | July 6, 1943 |
| 2,371,085 | Waters | Mar. 6, 1945 |
| 2,486,765 | Snyder | Nov. 1, 1949 |
| 2,491,047 | Hunt et al. | Dec. 13, 1949 |